(12) United States Patent
Burns et al.

(10) Patent No.: US 10,059,061 B2
(45) Date of Patent: Aug. 28, 2018

(54) COMPOSITE MANUFACTURING WITH A MULTI-DIMENSIONAL ARRAY OF INDEPENDENTLY-CONTROLLABLE THERMAL ZONES

(71) Applicant: THE BOEING COMPANY, Huntington Beach, CA (US)

(72) Inventors: Lauren A. Burns, Melbourne (AU); Max M. Osborne, Brighton (AU); Martin A. Szarski, Canterbury (AU); Ronnie K. Ligeti, Melbourne (AU); David Pook, Melbourne (AU); Andrew K. Glynn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 14/877,469

(22) Filed: Oct. 7, 2015

(65) Prior Publication Data
US 2017/0100894 A1    Apr. 13, 2017

(51) Int. Cl.
*G06F 9/44*    (2018.01)
*B29C 67/00*    (2017.01)
(Continued)

(52) U.S. Cl.
CPC ...... *B29C 67/0088* (2013.01); *B29C 35/0266* (2013.01); *B29C 35/0288* (2013.01);
(Continued)

(58) Field of Classification Search
CPC ................................................ B29C 67/0088
(Continued)

(56) References Cited

U.S. PATENT DOCUMENTS 5,158,132 A * 10/1992 Guillemot ............... B29C 33/02
100/320
7,225,560 B2 * 6/2007 Govek ................... B41C 1/1075
34/268
(Continued)

FOREIGN PATENT DOCUMENTS

| GB | 2507080 A | 4/2014 |
|---|---|---|
| WO | 2011048376 A1 | 4/2011 |
| WO | 2012106639 A1 | 8/2012 |

OTHER PUBLICATIONS

Great Britain Office Action dated Feb. 15, 2017 in Great Britain patent application No. GB1615022.9.
(Continued)

*Primary Examiner* — Evral E Bodden
(74) *Attorney, Agent, or Firm* — Womble Bond Dickinson (US) LLP

(57) ABSTRACT

A system for manufacturing a composite structure includes a tool with a surface for supporting component elements of the composite structure. The surface is divided into a multi-dimensional array of thermal zones for in-process control of the temperature of a component element (e.g. resin) of the composite structure. The sensors sense a characteristic of the component element and provide sensor data, which is applied to a machine-learning algorithm configured to generate control data to achieve a defined quality goal. A controller then independently controls the thermal zones to locally heat, cool or maintain the temperature of the component element according to the control data to advance the component element or composite structure to the defined quality goal. This may be performed over a plurality of instances during which the machine-learning algorithm learns to increase advancement of the component element or composite structure to the defined quality goal.

18 Claims, 8 Drawing Sheets

(51) Int. Cl.
   *G05B 19/18*   (2006.01)
   *B29C 70/44*   (2006.01)
   *B29C 35/02*   (2006.01)
   *B33Y 50/02*   (2015.01)
   *B29C 37/00*   (2006.01)

(52) U.S. Cl.
   CPC ............ *B29C 70/44* (2013.01); *G05B 19/182* (2013.01); *B29C 2037/90* (2013.01); *B33Y 50/02* (2014.12); *G05B 2219/36039* (2013.01); *Y02T 50/433* (2013.01)

(58) Field of Classification Search
   USPC ........................................................ 700/119
   See application file for complete search history.

(56) References Cited

U.S. PATENT DOCUMENTS

| | | | |
|---|---|---|---|
| 8,511,362 B2* | 8/2013 | Walczyk | B29C 70/44 156/286 |
| 9,370,877 B2* | 6/2016 | Halford | B29C 35/0288 |
| 2015/0123323 A1* | 5/2015 | Obrecht | B29C 70/443 264/571 |
| 2016/0001359 A1* | 1/2016 | Voglewede | B22C 9/065 164/4.1 |

OTHER PUBLICATIONS

"Control Theory", Wikipedia, https://en.wikipedia.org/wiki/Control_theory, Retrieved Aug. 8, 2015.
"Reinforcement Learning", Wikipedia, https://en.wikipedia.org/wiki/Reinforcement_learning, Retrieved Aug. 14, 2015.
Matthew W. Arney et at., "Integrally-Heated Tooling for the Manufacture of Fibre-Reinforced Composites", Composites Processing 2004, Composites Processing Association, Apr. 23, 2004.
Jesus I. Maldonado et al., "Curing Inhomogeneity During Reactive Flow in Fiber Preforms", Sample, 2013.
J. S. Leng et al., "Real-time Cure Monitoring of Smart Composite Materials Using Extrinsic Fabry-Perot Interferometer and Fiber Bragg Grating Sensors", Smart Materials and Structures, vol. 11, pp. 249-255, 2002.
Volodymyr Mnih et al., "Human-level Control Through Deep Reinforcement Learning", Nature vol. 518. No. 7540, pp. 529-533, Feb. 26, 2015.

* cited by examiner

COMPOSITE MANUFACTURING WITH A MULTI-DIMENSIONAL ARRAY OF INDEPENDENTLY-CONTROLLABLE THERMAL ZONES

TECHNOLOGICAL FIELD

The present disclosure relates generally to composite structure manufacturing and, in particular, to composite structure manufacturing with a multi-dimensional array of independently-controlled thermal zones.

BACKGROUND

Aircraft are being designed and manufactured with greater and greater percentages of composite materials. Some aircraft may have more than fifty percent of their primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials, created by combining two or more dissimilar components. For example, a composite may include fibers and resins. The fibers and resins are combined and cured to form a composite material.

By using composite materials, portions of an aircraft may be created in larger pieces or sections. This is called integrated structure. For example, a fuselage in an aircraft may be created in cylindrical sections that may be put together to form the fuselage of the aircraft. Other examples include, for example, without limitation, wing skins, span-wise stiffeners, spars and chordwise ribs joined to form a wing, stabilizer sections joined to form a stabilizer, a stiffener, a fairing, a control surface, a skin, a skin section, a door, a strut, and a tubular structure.

In manufacturing composite components, the materials typically are formed using a mold. These molds also are referred to as tools. A tool has sufficient rigidity to maintain the desired shape for the composite component when the composite materials are placed onto the tools. A tool may be metallic or non-metallic in composition to provide rigidity for supporting the composite materials.

Currently, many composites in a manufactured aircraft require an autoclave to cure the composite components. Resins in pre-impregnated plies typically need an elevated temperature to achieve a chemical reaction that allows these resins to flow and cure, and an elevated pressure to achieve ply consolidation and expel gases contained within the pre-impregnated plies, known as porosity. With large components, a large autoclave is needed to encompass the component and the tool for processing.

Conventional composite manufacturing processes often encounter undesirable inconsistency, which may in turn result in reduced yield, increased scrap and rework, or performance/weight penalties resulting from reduced design allowables (structural knockdowns). Examples of common undesirable inconsistency include those associated with porosity, manufacturing tolerances due to spring-back and warping and adhesion and wrinkling of the first ply down, or subsequent plies in the part stack under consolidation vacuum. It may therefore be desirable to have an apparatus and method that addresses these challenges, improves upon existing practices and having the potential to work within existing process specifications.

BRIEF SUMMARY

Example implementations of the present disclosure are directed to an improved system and method for manufacturing a composite structure, which may be applied to pre-impregnated and resin infused plies for any suitable manufacturing process, including in-autoclave, out-of-autoclave and resin infused processes. The system and method of example implementations address common manufacturing undesirable inconsistencies encountered during composite manufacturing (or fabrication) and to improve yield, reduce scrap and re-work, or performance/weight penalties resulting from reduced design allowables (structural knockdowns). As indicated or suggested above, the undesirable inconsistency that may be addressed by the system and method include, for example, those associated with porosity, manufacturing tolerances due to spring-back and warping, wrinkling of the plies under consolidation vacuum, and/or the adhesion of the first ply onto the tool.

Example implementations provide a process that logs in-process monitoring sensor data. This sensor data may be input to a software algorithm based on machine-learning principles that outputs the programmable logic to independently control a multi-dimensional (two-dimensional or three-dimensional) array of thermal zones (sometimes referred to as a pixelated array or pixelated thermal zones) for locally heating, cooling or maintaining the temperature of component element(s) of a composite structure during its manufacture. The higher dimensional thermal control of the pixelated zones may improve the manufacturing quality of composite structures, including the ability to respond to anomalies in real time (real time herein referring to real time or near real time).

In the manufacture of a composite structure, a bed of fibers may be pre-impregnated with resin, or held together with a binder and infused with resin. Example implementations may have the ability to reduce porosity and infusion time of resin infused composites via active thermal control of resin viscosity and effective steering of the resin flow front during the infusion of resin into a bed of fibers (e.g., dry fiber reinforcement). Example implementations may be able to locally alter the temperature to change the frictional viscosity of resin (for a pre-impregnated bed of fibers) or binder (for a bed of fibers to be resin infused) to reduce wrinkling of plies during vacuum forming processes. Example implementations may also be able to counteract spring-back and warpage caused by laminate asymmetry by applying differing thermal ramp rates to locally alter the process induced strains from the resin polymer cross linking. Even further, example implementations may be able to heat the tool to aid in adhesion of the binder (for a bed of fibers to be resin infused) or resin (for a pre-impregnated bed of fibers) to lay down the first ply onto the tool.

The present disclosure thus includes, without limitation, the following example implementations. In some example implementations, a system is provided for manufacturing a composite structure. The system comprises a tool, a plurality of sensors, a computing device and a controller. The tool has a surface configured to support component elements of a composite structure. The tool also has plurality of heating/cooling devices configured to provide a plurality of thermal zones into which the surface is divided. The plurality of heating/cooling devices and thereby the plurality of zones are arranged in a multi-dimensional array and independently controllable to locally heat, cool or maintain a temperature of a component element of the component elements during manufacture of the composite structure therefrom. The plurality of sensors is configured to sense a characteristic of the component element at a respective plurality of spatially-distributed points, and provide sensor data corresponding thereto. The computing device is coupled to the plurality of sensors and configured to apply the sensor data to a machine-learning algorithm configured to generate control data to achieve a defined quality goal for the component element or composite structure. And the controller is coupled to the computing device and tool, and configured to independently control the plurality of heating/cooling devices and thereby the plurality of thermal zones to locally heat, cool or maintain the temperature of the component element according to the control data to advance the component element or composite structure to the defined quality goal. In these example implementations, the plurality of sensors is configured to sense the characteristic and provide sensor data corresponding thereto, the computing device is configured to apply the sensor data to the machine-learning algorithm, and the controller is configured to independently control the plurality of heating/cooling devices and thereby the plurality of thermal zones, at a plurality of instances during manufacture of the composite structure from the component elements, the machine-learning algorithm learning over the plurality of instances to increase advancement of the component element or composite structure to the defined quality goal. That is, the machine-learning algorithm may learn over the plurality of instances to generate control data that better achieves the defined quality goal.

In some example implementations of the system of the preceding or any subsequent example implementation, or any combination thereof, each sensor of the plurality of sensors is associated with, and configured to sense the characteristic of the composite structure at, a respective thermal zone.

In some example implementations of the system of any preceding or any subsequent example implementation, or any combination thereof, the component elements of the composite structure include a bed of fibers pre-impregnated or to be infused with resin, and the plurality of heating/cooling devices and thereby the plurality of thermal zones are independently controllable to locally heat, cool or maintain the temperature of the resin.

In some example implementations of the system of any preceding or any subsequent example implementation, or any combination thereof, the characteristic of the component element is a presence or absence, temperature, pressure or degree of cure of the resin, or an out-of-plane distortion of the bed of fibers.

In some example implementations of the system of any preceding or any subsequent example implementation, or any combination thereof, manufacture of the composite structure includes a flow of resin across the bed of fibers to thereby infuse the bed of fibers with resin, and the defined quality goal for the component element or composite structure includes a desired shape of a front of the flow of resin (a desired shape of the flow front), which may be either or both the in-plane flow or through-thickness flow front. In these example implementations, the machine-learning algorithm is configured to generate control data to achieve the desired shape of the front of the flow of resin, and the controller is configured to independently control the plurality of heating/cooling devices and thereby the plurality of thermal zones to locally heat, cool or maintain the temperature of the resin to locally control viscosity of the resin and thereby steer the front of the flow of resin to the desired shape thereof.

In some example implementations of the system of any preceding or any subsequent example implementation, or any combination thereof, the characteristic of the component element is a presence or absence of resin. In these example implementations, the computing device being configured to apply the sensor data to the machine-learning algorithm includes being configured to at least: generate a binary image bitmap of the bed of fibers indicating the presence or absence of resin at the respective plurality of spatially-distributed points; extract a contour of a front (in-plane and/or through-thickness) of the flow of resin from the bitmap to generate a cloud of vector points; and measure along vector points of the cloud of vector points, curvature at each point of at least some of the respective plurality of spatially-distributed points, and thereby produce curvature statistics for application to the machine-learning algorithm configured to selectively apply a penalty or reward at each of at least some of the respective plurality of spatially-distributed points based on the curvature statistics.

In some example implementations of the system of any preceding or any subsequent example implementation, or any combination thereof, the machine-learning algorithm being configured to selectively apply a penalty or reward includes for each point of at least some of the respective plurality of spatially-distributed points, being configured to selectively apply a penalty or reward for respectively high curvature or low curvature at the point, with the machine-learning algorithm being configured to generate control data to achieve the defined quality goal of a straight front of the flow of resin.

In some example implementations of the system of any preceding or any subsequent example implementation, or any combination thereof, manufacture of the composite structure includes a curing of the resin, and the defined quality goal for the component element or composite structure includes a desired shape of the composite structure. In these example implementations, the machine-learning algorithm is configured to generate control data to achieve the desired shape of the composite structure, and the controller is configured to independently control the plurality of heating/cooling devices and thereby the plurality of thermal zones to locally heat, cool or maintain the temperature of the resin to locally control thermal gradients and degree of cure of the resin, and thereby process-induced strains within the composite structure to counter any spring-back in the composite structure.

In some example implementations of the system of any preceding or any subsequent example implementation, or any combination thereof, the component elements of the composite structure include a plurality of plies of fibers each ply of which is pre-impregnated with resin or held together with a binder, and the plurality of heating/cooling devices and thereby the plurality of thermal zones are independently controllable to locally heat, cool or maintain the temperature of the resin or binder. In these example implementations, manufacture of the composite structure includes lay-up of a first of the plurality of plies and ply consolidation, and the defined quality goal for the component element or composite structure includes minimization of out-of-plane fiber distortion (wrinkles) formed during lay-up of the first of the plurality of plies or ply consolidation. Also in these example implementations, the machine-learning algorithm is configured to generate control data to achieve the minimization of out-of-plane fiber distortion, and the controller is configured to independently control the plurality of heating/cooling devices and thereby the plurality of thermal zones to locally heat, cool or maintain the temperature of the resin or binder to locally control frictional viscosity of the resin or binder during lay-up of the first of the plurality of plies or ply consolidation.

In some example implementations of the system of any preceding or any subsequent example implementation, or any combination thereof, the characteristic of the component element is a thickness of the composite structure during lay-up of the first of the plurality of plies or ply consolidation, changes in which indicate an out-of-plane fiber distortion.

In some example implementations, a method is provided for manufacturing a composite structure. The method comprises supporting elements of a composite structure on a surface of a tool. The tool has a plurality of heating/cooling devices configured to provide a plurality of thermal zones into which the surface is divided. The plurality of heating/cooling devices and thereby the plurality of thermal zones are arranged in a multi-dimensional array and independently controllable to locally heat, cool or maintain a temperature of a component element of the component elements during manufacture of the composite structure therefrom. The method comprises sensing by a plurality of sensors, a characteristic of the component element at a respective plurality of spatially-distributed points, and providing sensor data corresponding thereto. The method comprises applying the sensor data to a machine-learning algorithm that generates control data to achieve a defined quality goal for the component element or composite structure. And the method comprises independently controlling the plurality of heating/cooling devices and thereby the plurality of thermal zones to locally heat, cool or maintain the temperature of the component element according to the control data to advance the component element or composite structure to the defined quality goal. In these example implementations, sensing the characteristic and providing sensor data corresponding thereto, applying the sensor data to the machine-learning algorithm, and independently controlling the plurality of heating/cooling devices and thereby the plurality of thermal zones, occur at a plurality of instances during manufacture of the composite structure from the component elements, the machine-learning algorithm learning over the plurality of instances to increase advancement of the component element or composite structure to the defined quality goal.

In some example implementations of the method of the preceding or any subsequent example implementation, or any combination thereof, each sensor of the plurality of sensors is associated with, and senses the characteristic of the composite structure at, a respective thermal zone.

In some example implementations of the method of any preceding or any subsequent example implementation, or any combination thereof, the component elements of the composite structure include a bed of fibers pre-impregnated or to be infused with resin, and the plurality of heating/cooling devices and thereby the plurality of thermal zones are independently controllable to locally heat, cool or maintain the temperature of the resin.

In some example implementations of the method of any preceding or any subsequent example implementation, or any combination thereof, the characteristic of the component element is a presence or absence, temperature, pressure or degree of cure of the resin, or an out-of-plane distortion of the bed of fibers.

In some example implementations of the method of any preceding or any subsequent example implementation, or any combination thereof, manufacture of the composite structure includes a flow of resin across the bed of fibers to thereby infuse the bed of fibers with resin, and the defined quality goal for the component element or composite structure includes a desired shape of a front of the flow of resin. In these example implementations, the machine-learning algorithm generates control data to achieve the desired shape of the front of the flow of resin, and the plurality of heating/cooling devices and thereby the plurality of thermal zones are independently controlled to locally heat, cool or maintain the temperature of the resin to locally control viscosity of the resin and thereby steer the front of the flow of resin to the desired shape thereof.

In some example implementations of the method of any preceding or any subsequent example implementation, or any combination thereof, the characteristic of the component element is a presence or absence of resin. In these example implementations, applying the sensor data to the machine-learning algorithm includes at least: generating a binary image bitmap of the bed of fibers indicating the presence or absence of resin at the respective plurality of spatially-distributed points; extracting a contour of a front of the flow of resin from the bitmap to generate a cloud of vector points; and measuring along vector points of the cloud of vector points, curvature at each point of at least some of the respective plurality of spatially-distributed points, and thereby producing curvature statistics for application to the machine-learning algorithm that selectively applies a penalty or reward at each of at least some of the respective plurality of spatially-distributed points based on the curvature statistics.

In some example implementations of the method of any preceding or any subsequent example implementation, or any combination thereof, the machine-learning algorithm selectively applying a penalty or reward includes for each point of at least some of the respective plurality of spatially-distributed points, selectively applying a penalty or reward for respectively high curvature or low curvature at the point, with the machine-learning algorithm generating control data to achieve the defined quality goal of a straight front of the flow of resin.

In some example implementations of the method of any preceding or any subsequent example implementation, or any combination thereof, manufacture of the composite structure includes a curing of the resin, and the defined quality goal for the component element or composite structure includes a desired shape of the composite structure. In these example implementations, the machine-learning algorithm generates control data to achieve the desired shape of the composite structure, and the plurality of heating/cooling devices and thereby the plurality of thermal zones are independently controlled to locally heat, cool or maintain the temperature of the resin to locally control thermal gradients and degree of cure of the resin, and thereby process-induced strains within the composite structure to counter any spring-back in the composite structure.

In some example implementations of the method of any preceding or any subsequent example implementation, or any combination thereof, the component elements of the composite structure include plies of fibers each ply of which is pre-impregnated with resin or held together with a binder, and the plurality of heating/cooling devices and thereby the plurality of thermal zones are independently controllable to locally heat, cool or maintain the temperature of the resin or binder. In these example implementations, manufacture of the composite structure includes lay-up of the first of the plies and ply consolidation, and the defined quality goal for the component element or composite structure includes minimization of out-of-plane fiber distortion (wrinkles) formed during lay-up of the first of the plies or ply consolidation. Also in these example implementations, the machine-learning algorithm generates control data to achieve the minimization of out-of-plane fiber distortion, and the plurality of heating/cooling devices and thereby the plurality of thermal zones are independently controlled to locally heat, cool or maintain the temperature of the resin or binder to locally control frictional viscosity of the resin or binder during lay-up of the first of the plies or ply consolidation.

In some example implementations of the method of any preceding or any subsequent example implementation, or any combination thereof, the characteristic of the component element is a thickness of the composite structure during lay-up of the first of the plies or ply consolidation, changes in which indicate an out-of-plane distortion.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
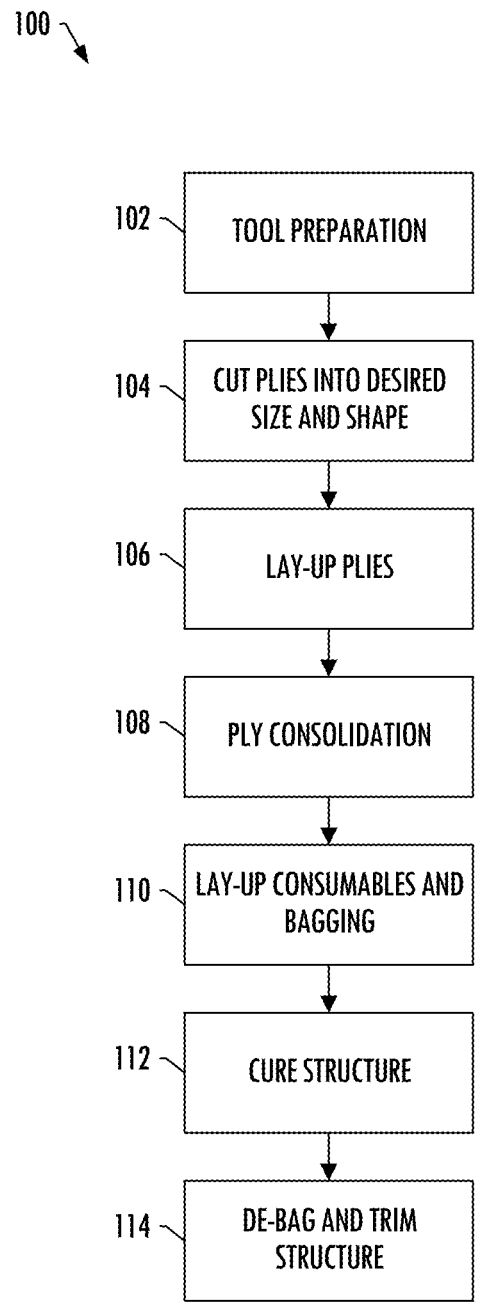
FIG. 1 illustrates various steps in a method of manufacturing a composite structure that may benefit from at least some example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure relate generally to composite structure manufacturing, and as indicated above, may be applied to pre-impregnated and resin infused plies for any suitable manufacturing process, including in-autoclave, out-of-autoclave and resin infused processes. The structure may be any of a number of different structures composed of one or more layers (more specifically "plies" in some examples), each of which in some examples may include a bed of fibers (at times more simply referred to as a ply or a ply of fibers). The bed of fibers may be pre-impregnated with resin, or held together with a binder and to be infused with resin. These composite structures may be composed of a plurality of component elements including, for example, one or more plies of fibers each ply of which may be pre-impregnated with resin or held together with a binder (and to be infused with resin). Examples of suitable structures include composites, laminated composites and the like, such as laminated composites of unidirectional tape plies, layered metallic structures, metallic or composite skin and core (sandwich structures) and the like. These structures may be put to use in a number of different manners, such as on manned or unmanned vehicles (e.g., motor vehicles, railed vehicles, watercraft, aircraft, spacecraft).

FIG. 1 illustrates various steps in a method 100 of manufacturing a composite structure that may benefit from at least some example implementations of the present disclosure, although example implementations may be equally applicable to other methods of composite manufacturing. As shown at block 102, the method may include preparation of a tool (or mold), which may include cleaning and applying a release agent chemical to the tool. One or more plies of fibers may be cut to a desired size and shape, and placed onto the tool in their correct order, as shown at blocks 104 and 106. As indicated above, these plies may be pre-impregnated with resin, or held together with a binder and to be infused with resin.

The method 100 may include ply consolidation, as shown at block 108. In the case of pre-impregnated plies, this ply consolidation may include periodic consolidation (debulking) of the plies by sealing the lay-up under a vacuum bag with a layer of permeable material to provide an air path to evacuate volatiles. The debulking may be accomplished by applying full vacuum for a certain period of time (e.g., 5-10 minutes) to consolidate and remove air from the plies.

In the case of resin infusion, ply consolidation is often referred to as pre-forming. This involves laying up the plies, placing the plies under vacuum to form them into the correct shape and taking the plies up to a temperature (e.g., 330° F.) that melts the binder. This sets the plies into the correct shape. In some examples, the plies may be trimmed and then transferred from the pre-forming tooling onto an infusion tool. This pre-forming may more often be performed where the geometry is complex and the plies cannot be adequately laid up in-situ.

For both pre-impregnated plies and those to be infused with resin, the method 100 may include a lay-up consumables and bagging step, as shown at block 110. Here, a layer of release film may be placed over the lay-up as a protective barrier over the plies, and a layer of permeable material may be placed over the release film to create an air path. For pre-impregnated plies, this air path may be to remove gases and volatiles from the plies. For plies to be infused with resin, the air path may create a path to infuse resin into the plies (or more specifically their respective beds of fibers). For both types of plies, the lay-up may be covered in a vacuum bag that is sealed air tight to the tool.

The structure may then be cured, as shown at block 112. For pre-impregnated plies, this may include placing the bagged lay-up in an autoclave. For plies to be infused with resin, this may include placing the bagged lay-up in an oven, and connecting the lay-up to a resin source. Pressure and temperature profiles may be applied according to a recommended cure cycle to cure the resin in the case of pre-impregnated plies, or infuse the plies with resin and cure the resin in the case of plies to be infused. After the cure cycle, the composite structure may be de-bagged and trimmed, as shown at block 114. This may include removal of the tool from the autoclave (for pre-impregnated plies) or oven (for resin infusion), and removal of consumables (vacuum bag, permeable material and release film). The cured composite structure may be de-moulded from the tool, and trimmed to remove sharp edges and create a desired final shape.

Example implementations of the present disclosure may be applied in-process during manufacture of the composite part to achieve one or more certain defined quality. Example implementations may be applied before, after or during any of a number of different steps of the method 100 of manufacturing a composite structure, such as during ply lay-up (block 106), consolidation (block 108) and/or resin infusion and cure (block 112). In accordance with example implementations, a multi-dimensional (two-dimensional or three-dimensional) array of independently-controlled thermal zones may be used to address common manufacturing undesirable inconsistency encountered during composite manufacturing (or fabrication) and to improve yield, reduce scrap and re-work, or performance/weight penalties resulting from reduced design allowables (structural knockdowns). More particularly, example implementations provide reinforcement-learning-based, independent control of thermal zones of a multi-dimensional array of thermal zones to heat, cool or maintain the temperature of component element(s) of a composite structure during its manufacture. Example implementations may be applied to provide advanced, real-time, in-process quality control of a composite structure such as using either resin infusion, in-autoclave or out-of-autoclave pre-impregnated processes.

Figure 2A:
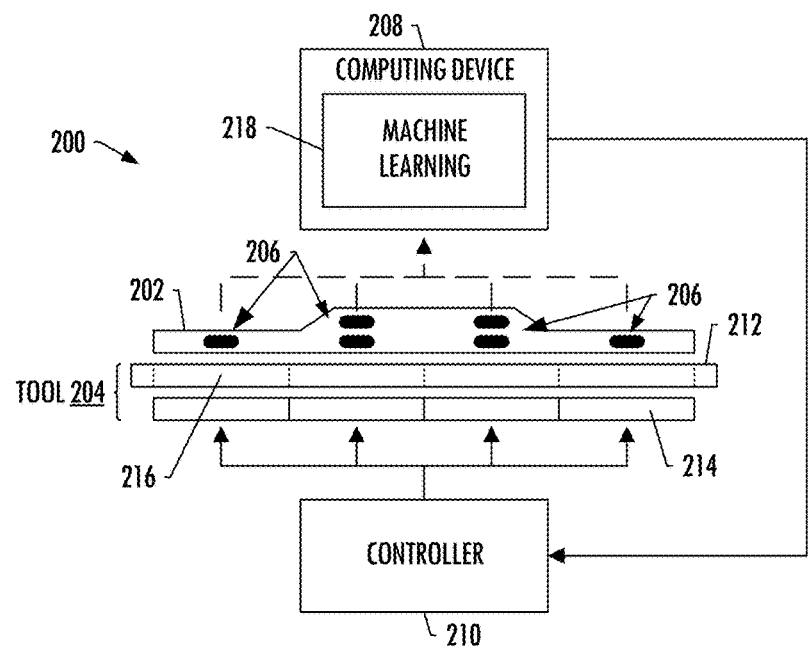
FIGS. 2A and 2B illustrate a system for manufacturing a composite structure, according to some example implementations of the present disclosure.
Figure 2B:
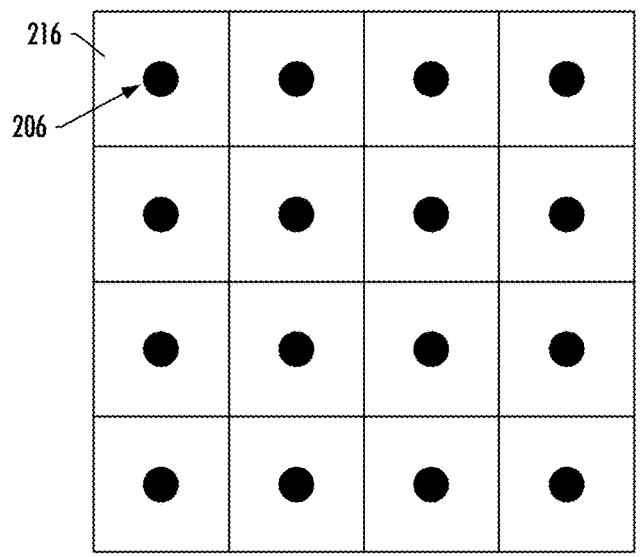

FIGS. 2A and 2B illustrate a system 200 for manufacturing a composite structure 202, according to some example implementations of the present disclosure. As indicated above and described in greater detail below, the system may be configured to carry out operations during manufacture of the composite structure to achieve one or more defined quality goals. The system may operate during ply lay-up and/or consolidation to minimize out-of-plane fiber distortion that may otherwise form during those steps. For example, the system may heat the tool to aid in adhesion of the binder (for a bed of fibers to be resin infused) or resin (for a pre-impregnated bed of fibers) to lay down the first ply onto the tool. In another example, the system may locally alter the temperature to change the frictional viscosity of resin (for a pre-impregnated bed of fibers) or binder (for a bed of fibers to be resin infused) to reduce wrinkling of plies during vacuum forming processes.

The system 200 may operate during resin infusion and cure to maintain a desired shape of the front of the flow of resin. More particularly, for example, the system may apply active thermal control of resin viscosity and thereby effectively steer the resin flow front to maintain a straight flow front with minimum curvature, which may minimize the chance of trapping off the resin flow front, creating areas of porosity that decrease quality of the composite structure. In yet another example, the system may operate to achieve a desired shape of the composite structure, such as its nominal engineering shape. Here, the system may apply differing thermal ramp rates to locally alter the process induced strains from the resin polymer cross linking, and may thereby counteract spring-back and warpage caused by laminate asymmetry.

The system 200 may include one or more of each of any of a number of different subsystems (each an individual system) for performing one or more functions or operations with respect to manufacture of the composite structure 202. As shown, for example, the system may include a tool 204 (or mold), a plurality of sensors 206, a computing device 208 and a controller 210 coupled to one another. Although being shown together as part of the system, it should be understood that any one or more of the tool sensors, computing device or controller may function or operate as a separate system without regard to the other. And further, it should be understood that the system may include one or more additional or alternative subsystems than those shown in FIGS. 2A and 2B.

The tool 204 may have a surface 212 configured to support component elements (e.g., one or more plies of fibers, resin) of the composite structure 202. As shown in FIG. 2A and more particularly in FIG. 2B, the tool may also have a plurality of heating/cooling devices 214 configured to provide a plurality thermal zones 216 (one of each of which is specifically called out in FIG. 3) into which the surface is divided. The heating/cooling devices and thereby the thermal zones may be arranged in a multi-dimensional array and independently controllable to locally heat, cool or maintain a temperature of a component element of the component elements during manufacture of the composite structure therefrom. In some examples, the heating/cooling devices and thereby the thermal zones are independently controllable to locally heat, cool or maintain the temperature of the resin.

The heating/cooling devices 214 may provide the thermal zones 216 in any of a number of different manners. In some examples, the surface may be composed of a plurality of individual heating/cooling devices with respective surfaces arranged in a multi-dimensional array to form the surface of the tool. Each of these heating/cooling devices may be controllable to heat, cool or maintain temperature and thereby provide a respective thermal zone. In other examples, a similar plurality of individual heating/cooling devices arranged in a multi-dimensional array may be situated underneath and be in thermal communication with the surface of the tool. Examples of suitable heating/cooling devices include those commercially available from Surface Generation Ltd. of the United Kingdom, as well as those commercially available from Qpoint Composite GmbH of Germany.

The plurality of sensors 206 may be configured to sense a characteristic of the component element at a respective plurality of spatially-distributed points, and provide sensor data corresponding thereto. In some examples, each sensor of the plurality of sensors is associated with, and configured to sense the characteristic of the composite structure 202 at, a respective thermal zone 216. Examples of sensors include piezo-electric and fiber-optic sensors that can measure characteristics such as the presence, temperature, pressure and/or degree of cure of the resin or binder. Another example of suitable sensors are optical sensors configured to detect thickness of the composite structure, changes in which indicate an out-of-plane fiber distortion. The sensors may be arranged in any of a number of different manners, and may be in a quantity greater than, equal to or less than the number of thermal zones. The sensors may be situated above, on or below the surface 212 of the tool. In some examples, the sensors may be situated above the vacuum bag. In some examples, the sensors may be arranged with respective individual heating/cooling devices 214 that provide the thermal zones.

The computing device 208 may be coupled to the plurality of sensors 206 and configured to generate control data to achieve a defined quality goal for the component element or composite structure 202. The control data may be generated in accordance with a number of feedback control mechanisms. In some examples, the computing device may be configured to apply the sensor data to a machine-learning algorithm 218 (e.g., computer-readable program code) configured to generate control data to achieve the defined quality goal for the component element or composite structure. Examples of suitable machine-learning algorithms include reinforcement-learning algorithms, genetic algorithms, evolutionary algorithms or the like. In some examples, as described in greater detail below, these and other machine-learning algorithms may generate appropriate control data using a penalty or reward scheme.

The controller 210 may be coupled to the computing device 208 and tool 204, and configured to independently control the heating/cooling devices 214 and thereby the thermal zones 216 to locally heat, cool or maintain the temperature of the component element according to the control data to advance the component element or composite structure 202 to the defined quality goal.

The above process carried out by the system 200 of example implementations may be repeated plurality of instances during manufacture of the composite structure 202 from the component elements. That is, the plurality of sensors 206 may be configured to sense the characteristic and provide sensor data corresponding thereto, the computing device 208 may be configured to apply the sensor data to the machine-learning algorithm 218, and the controller 210 may be configured to independently control the heating/cooling devices 214 and thereby the thermal zones 216, at a plurality of instances. This may allow the machine-learning algorithm to learn over the plurality of instances to increase advancement of the component element or composite structure to the defined quality goal.

In some examples, the component element affected by the thermal zones 216 is the resin, either from a pre-impregnated bed of fibers (ply), or bed of fibers that is infused with resin. In these examples, the heating/cooling devices 214 and thereby the thermal zones may be independently controllable to locally heat, cool or maintain the temperature of the resin. Also, in these examples, the characteristic of the component element (resin) may include one or more of a presence or absence, temperature, pressure or degree of cure of the resin, or an out-of-plane distortion of the bed of fibers.

As explained above, in some examples, manufacture of the composite structure 202 includes resin infusion, which may involve a flow of resin across the bed of fibers to thereby infuse the bed of fibers with resin. In these examples, the defined quality goal for the component element or composite structure may include a desired shape of a front of the flow of resin. The machine-learning algorithm 218 may therefore be configured to generate control data to achieve the desired shape of the front of the flow of resin. And the controller 210 may be configured to independently control the heating/cooling devices 214 and thereby the thermal zones 216 to locally heat, cool or maintain the temperature of the resin to locally control viscosity of the resin and thereby steer the front of the flow of resin to the desired shape thereof.

In some further examples, the characteristic of the component element may be a presence or absence of resin. In these examples, the computing device 208 may be configured to generate a binary image bitmap of the bed of fibers indicating the presence or absence of resin at the respective plurality of spatially-distributed points, and extract a contour of a front of the flow of resin from the bitmap to generate a cloud of vector points. The computing device may measure along vector points of the cloud of vector points, curvature at each point of at least some of the respective plurality of spatially-distributed points. The computing device may thereby produce curvature statistics for application to the machine-learning algorithm 218 configured to selectively apply a penalty or reward at each of at least some of the respective plurality of spatially-distributed points based on the curvature statistics. In yet further examples, for each point of at least some of the respective plurality of spatially-distributed points, the machine-learning algorithm may selectively apply a penalty or reward for respectively high curvature or low curvature at the point. The machine-learning algorithm may then generate control data to achieve the defined quality goal of a straight front of the flow of resin.

In some examples, manufacture of the composite structure 202 includes a curing of the resin, and the defined quality goal for the component element or composite structure includes a desired shape of the composite structure. In these examples, the machine-learning algorithm 218 may be configured to generate control data to achieve the desired shape of the composite structure. And the controller 210 may be configured to independently control the heating/cooling devices 214 and thereby the thermal zones 216 to locally heat, cool or maintain the temperature of the resin to locally control thermal gradients and degree of cure of the resin, and thereby process-induced strains within the composite structure to counter any spring-back in the composite structure.

This degree of cure may refer to either or both the in-plane or through-thickness degree of cure.

In some examples, the heating/cooling devices 214 and thereby the thermal zones 216 may be independently controllable to locally heat, cool or maintain the temperature of pre-impregnated resin or binder with which the fibers are held together. In these examples, manufacture of the composite structure 202 may include lay-up of the first of the plies and ply consolidation, and the defined quality goal for the component element or composite structure includes minimization of out-of-plane fiber distortion (wrinkles) formed during lay-up of the first of the plies or ply consolidation.

Ply consolidation may be applied to in-autoclave pre-impregnated plies, as well as out-of-autoclave pre-impregnated plies and plies for resin infusion. In the resin infusion process, the ply consolidation may be generally done once, at the completion of the lay-up. For both in-autoclave and out-of-autoclave pre-impregnated plies, the ply consolidation step may be repeated multiple times, such as after the first ply down, then at regular intervals (e.g., after every four plies have been laid down), and once again at the completion of the lay-up.

In conjunction with sensors 206 configured to measure out-of-plane ply distortion, the machine-learning algorithm 218, then, may be configured to generate control data for the heating/cooling devices 214 and thereby the thermal zones 216 to provide local temperature control to achieve the minimization of out-of-plane fiber distortion. And the controller 210 may be configured to independently control the heating/cooling devices and thereby the thermal zones according to the control data to locally heat, cool or maintain the temperature of the resin or binder to locally control frictional viscosity of the resin or binder during lay-up of the first of the plies or ply consolidation. In at least some of these examples, the characteristic of the component element may be a thickness of the composite structure during lay-up of the first of the plies or ply consolidation, changes in which indicate an out-of-plane fiber distortion.

Figure 3:
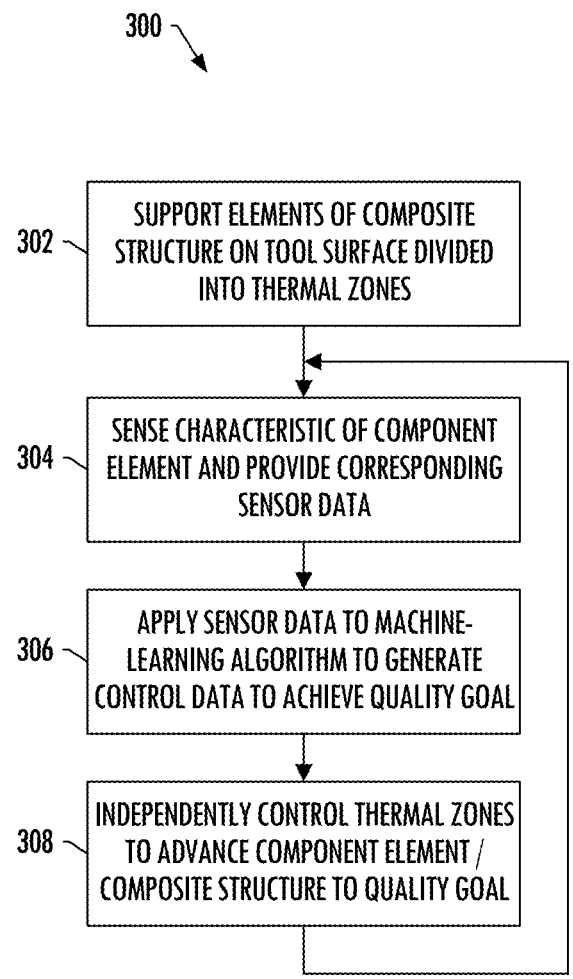
FIG. 3 is a flowchart illustrating various steps in a method of manufacturing a composite structure, according to various example implementations.

FIG. 3 is a flowchart illustrating various steps in a method 300 of manufacturing a composite structure, according to various example implementations. As shown at block 302, the method may include supporting elements of a composite structure 202 on a surface 212 of a tool 204. The tool may also have a plurality of heating/cooling devices 214 configured to provide a plurality of thermal zones 216 into which the surface is divided. The plurality of heating/cooling devices and thereby the plurality of thermal zones may be arranged in a multi-dimensional (two-dimensional or three-dimensional) array and independently controllable to locally heat, cool or maintain a temperature of a component element of the component elements during manufacture of the composite structure therefrom.

The method 300 may include sensing by a plurality of sensors 206, a characteristic of the component element at a respective plurality of spatially-distributed points, and providing sensor data corresponding thereto, as shown at block 304. The method may include applying the sensor data to a machine-learning algorithm 218 (e.g., reinforcement-learning algorithm) that generates control data to achieve a defined quality goal for the component element or composite structure, as shown at block 306. And the method may include independently controlling the heating/cooling devices 214 and thereby the thermal zones 216 to locally heat, cool or maintain the temperature of the component element according to the control data to advance the component element or composite structure to the defined quality goal, as shown at block 308. As also shown, the method may be repeated so that the sensor data may be provided and applied to the machine-learning algorithm, and the heating/cooling devices and thereby the thermal zones may be independently controlled, at a plurality of instances during manufacture of the composite structure from the component elements. This may include the machine-learning algorithm learning over the plurality of instances to increase advancement of the component element or composite structure to the defined quality goal.

The method 300 of example implementations may be applied during manufacture of a composite structure, or may be applied during simulated manufacture of the composite structure. This application of the method during simulated manufacture may provide a number of benefits that may be carried forward to the manufacture of the composite structure. For example, the machine-learning algorithm may be trained through simulated manufacture of the composite structure; and with this training, the machine-learning algorithm may be more accurately applied during the manufacture of the composite structure.

Figure 4A:
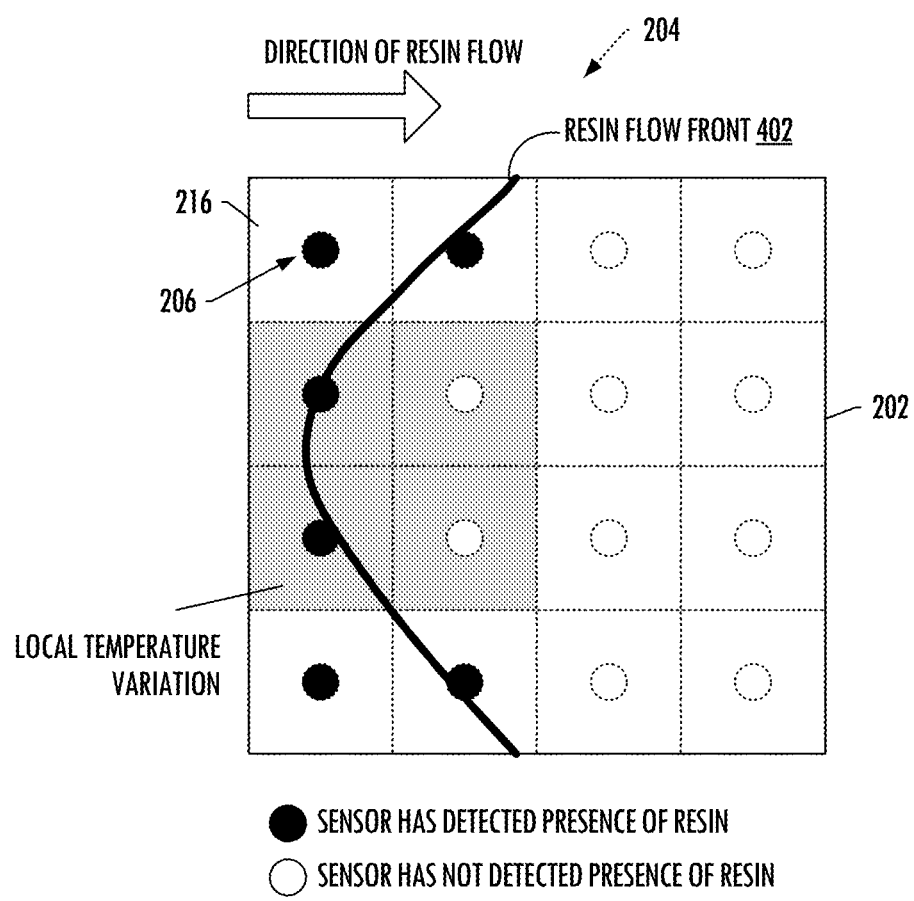
FIGS. 4A and 4B illustrate a composite structure laid up on a tool during resin infusion, and includes steering the resin flow front to achieve a desired quality goal, according to various example implementations.
Figure 4B:
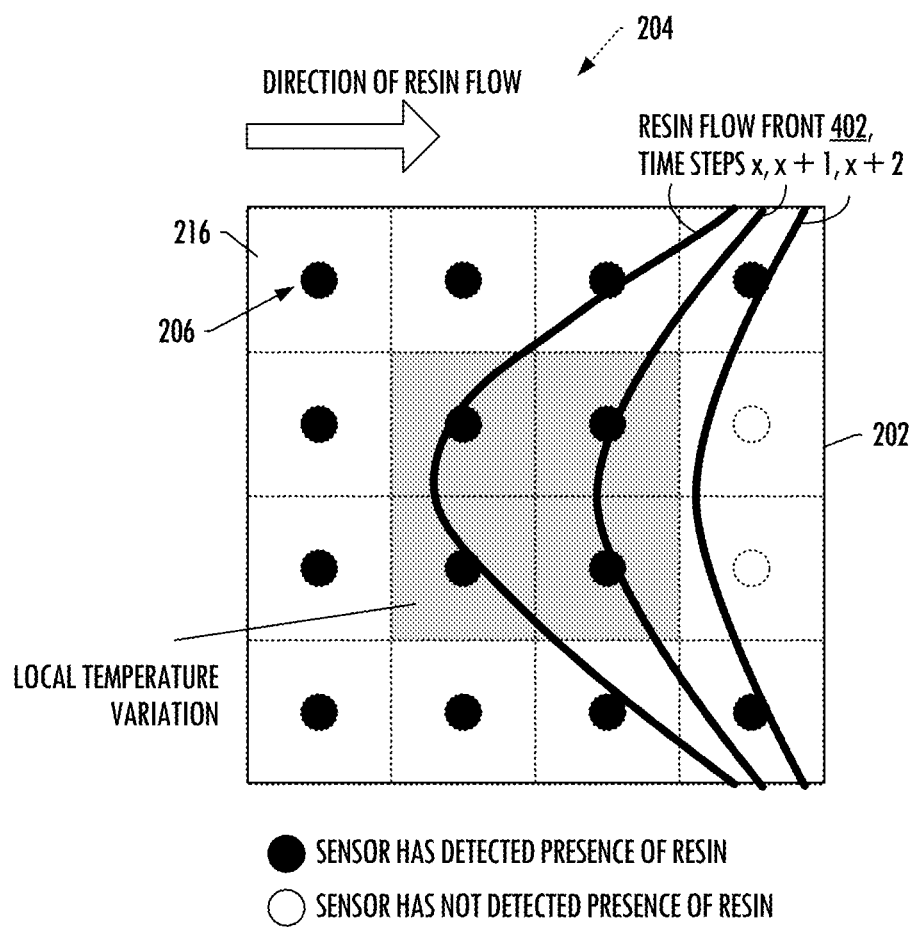

To further illustrate example implementations of the present disclosure, consider a case study in which the resin flow front may be steered on a composite structure with a thick pad-up in the center, representative of something like an attachment to a hinge point. FIGS. 4A and 4B illustrate a composite structure 202 laid up on a tool 204. Although not separately shown, in this and other examples, sensors 206 may be located either or both in-plane or through-thickness across the composite structure. In this example, the defined quality goal might be to maintain a straight flow front with minimum curvature, which may minimize the chance of trapping off the resin flow front, creating areas of porosity that decrease quality of the composite structure.

In accordance with example implementations of the present disclosure, as resin flows across the fibers, the sensors 206 may detect the presence or absence of resin for the computing device 208 to create a binary image bitmap, which may appear similar to the arrangement of sensors that have detected resin. The computing device may extract the contour of the resin flow front 402 from the bitmap to create a cloud of vector points, and measure the local and global curvature along the vector points at each sensor. The machine-learning algorithm 218 may apply a penalty based on the curvature statistics (penalty for high curvature, reward for low curvature to achieve desired outcome of straight line resin flow front), and provide a control data for the controller 210, which may individually instruct the heating/cooling devices 214 and thereby the thermal zones 216 to increase, decrease maintain their temperature. For example, the shaded thermal zones in FIG. 4A indicate those zones being controlled to increase in temperature to decrease the viscosity of the resin to increase the resin flow so that the flow front 'straightens up.'

In the example shown in FIG. 4B, at time step=x, the sensors 206 may detect that the flow front is lagging in the center due to the thick pad-up of material. The machine-learning algorithm 218 may in turn send control data to the controller 210 to locally increase the temperature in this region to locally decrease the viscosity of the resin. The flow front may begin to straighten at time step=x+1, and at time step=x+2, the sensors may detect that the flow front is more uniform. This may result in application of a reward at the machine-learning algorithm.

In some examples, the computing device 208 may start with the fill state of the composite structure 202, indicating how much of the composite structure has filled with resin, which inputs to the machine-learning algorithm 218. The machine-learning algorithm may generate appropriate control data, which may be input to the controller 110 for independent control of the heating/cooling devices 214 and thereby the thermal zones 216 to locally heat, cool or maintain the temperature of the resin. This may result in a change to the fill state. The loop may continue, and run at a desirable, efficient frequency (e.g., seconds or minutes), or the loop may complete only once per structure manufactured. In either instance, the machine-learning algorithm may learn using either real-life or computer simulation sensor data. Moreover, the reward system may be automated based on the sensor data, or manually controlled by an operator in the loop.

Example implementations of the present disclosure may blend two artificial intelligence techniques to create an intelligent control scheme that execute a policy to achieve a defined quality goal and react to unexpected quality variations in a sensible manner. Examples of artificial intelligence techniques that could be used and perhaps blended according to example implementations include reinforcement learning and deep neural networks, Bayesian inference and expert systems, and the like. In accordance with example implementations, the defined quality goal may be a high-level goal such as a straight resin front, instead of a simple target such as temperature value. The input to the control scheme may be significantly more complex than typical control schemes and may not necessarily directly correlate to the output as in other schemes.

Through machine-learning, the system 200 may take actions and observe the effect they have on the environment. In this context, the system may locally increase, decrease or maintain the temperature of the tool 204, and in turn the resin, and then observe the resin fill state via the sensors 206. Through repeated action/observation, the system may learn what actions are associated with what observations. The process of machine-learning may include application of a reward or penalty with certain observations such that the machine-learning algorithm 218 may learn to prefer certain actions so as to maximize the reward over time. That is, given an observation of the state of the composite structure or a component element of it (e.g., the resin), the machine-learning algorithm may learn to prefer actions (such as changing the temperature) that result in a maximum reward (a value that the algorithm tries to maximize, and is provided to the algorithm at every step according to how well it is achieving the goal).

Because the best action to take in a given situation may depend on knowledge both of the situation and past experience, a memory may be used in the form of a deep neural network that acts as a mapping between the current state, the set of possible actions, and the expected reward. This mapping may be what is refined through the learning process. This process can be performed in both simulation and on the actual composite structure, thereby enabling a bank of stored knowledge from simulation to be used before the first cure is run. One notable benefit of example implementations is its ability to detect and fix process anomalies during the manufacture of composite structures in real time (hard, firm or soft real time).

Figure 5:
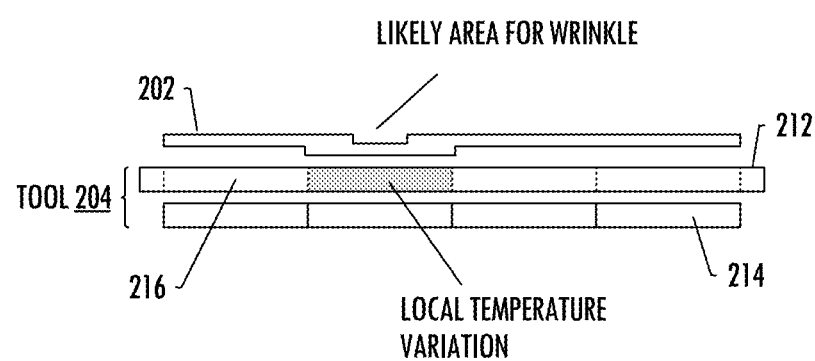
FIG. 5 illustrates a composite structure laid up on a tool during ply consolidation, and includes locally controlling the frictional viscosity of resin to achieve the quality goal of minimizing out-of-plane fiber distortion, according to various example implementations.

The case study of local tailoring of the resin temperature to influence the physical properties of the resin can be applied more generally. FIG. 5 shows a technique for locally controlling the frictional viscosity of resin (for a pre-impregnated bed of fibers) or binder (for a bed of fibers to be resin infused) as it affects fiber shearing during ply consolidation under vacuum, with the quality goal of minimizing out-of-plane fiber distortion that may characterize a wrinkle. In this case, sensors 206 using lasers or other suitable means may be used to measure any local changes in thickness that indicates an out-of-plane fiber distortion. A similar technique may be used to optimally heat the tool to aid in adhesion of the binder (for a bed of fibers to be resin infused) or resin (for a pre-impregnated bed of fibers) to lay down the first ply onto the tool 204.

Figure 6:
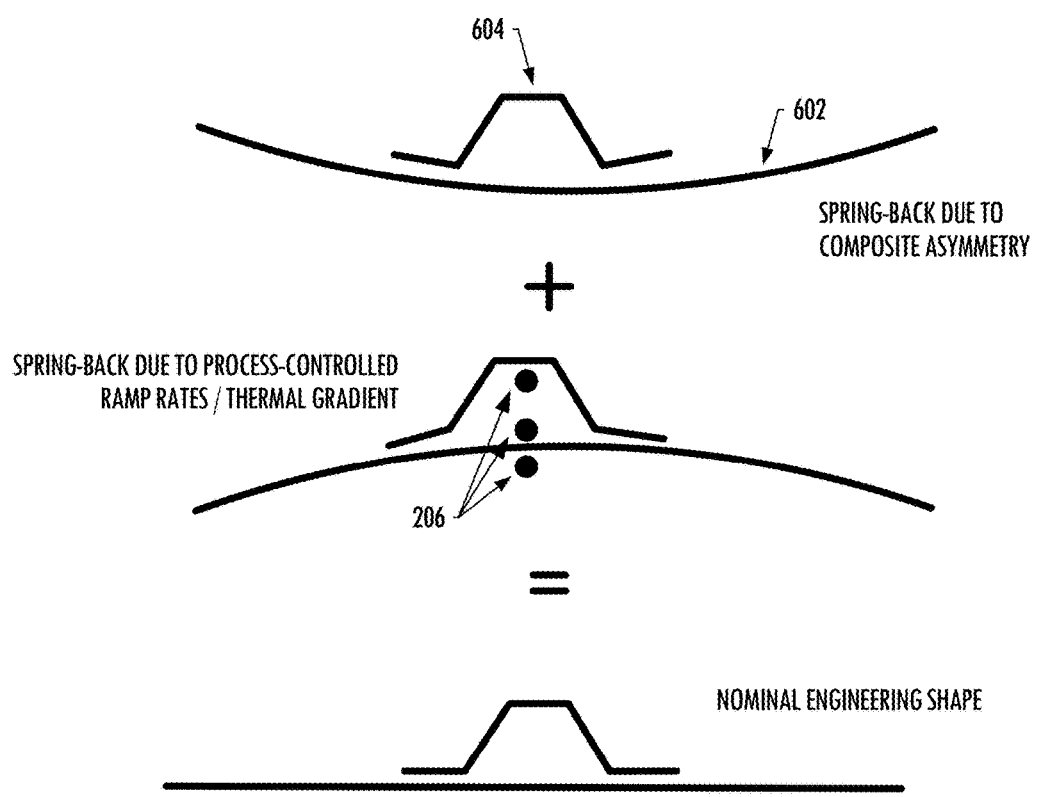
FIG. 6 illustrates a technique to counteract composite spring-back to achieve the quality goal of nominal engineering shape, according to example implementations of the present disclosure.

FIG. 6 demonstrates a technique to counteract composite spring-back to achieve the quality goal of nominal engineering shape. According to this technique, the through-thickness temperature gradient and heating rates may be controlled to control the in-plane and through-thickness degree of cure gradients and thereby alter the process-induced strains within the composite structure. FIG. 6 illustrates the skin 602 and a stiffening element 604 of a composite part. The stiffening element is shown as a hat-shaped stiffener, but it could be any of a number of other types of stiffening elements. Examples of other stiffening elements include a blade, l-, z- or I-shaped, omega stiffening element, or a pad-up which is a local area of increased skin thickness.

According to example implementations of the present disclosure, the computing device 208 may be implemented by various means. Means for implementing the computing device may include hardware, alone or under direction of one or more computer programs (e.g., machine-learning algorithm 218) from a computer-readable storage medium. In some examples, one or more apparatuses may be configured to function as or otherwise implement the computing device shown and described herein. In examples involving more than one apparatus, the respective apparatuses may be connected to or otherwise in communication with one another in a number of different manners, such as directly or indirectly via a wired or wireless network or the like.

Figure 7:
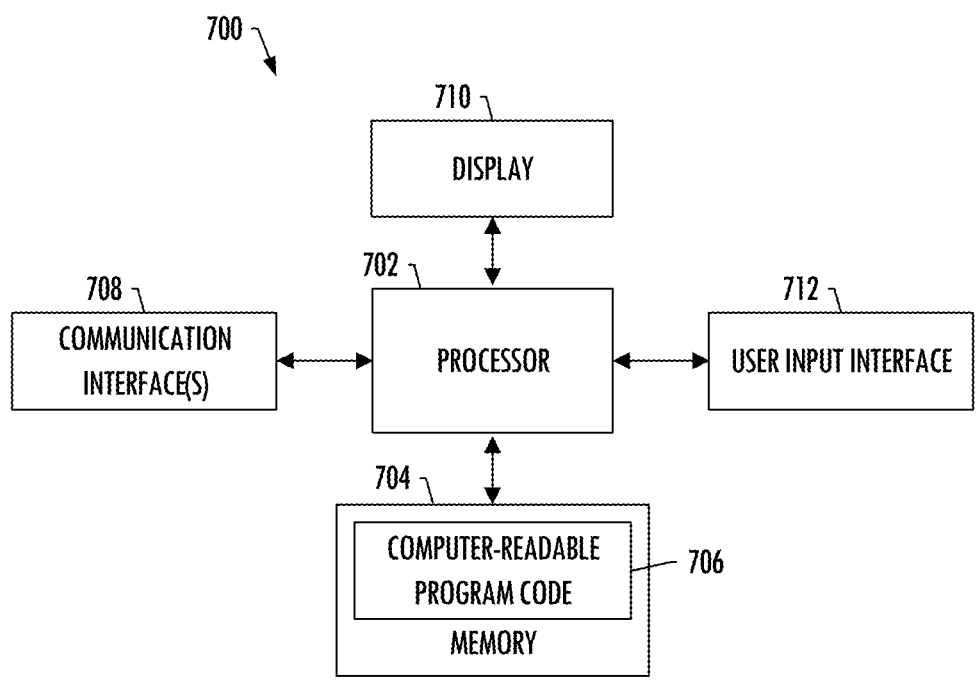
FIG. 7 illustrates an apparatus according to some example implementations.

FIG. 7 illustrates an apparatus 700 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 702 (e.g., processor unit) connected to a memory 704 (e.g., storage device).

The processor 702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 704 (of the same or another apparatus).

The processor 702 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processor 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 700 may include a processor 702 and a computer-readable storage medium or memory 704 coupled to the processor, where the processor is configured to execute computer-readable program code 706 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for manufacturing a composite structure, the system comprising:
    a tool having a surface configured to support component elements of a composite structure, and a plurality of heating/cooling devices configured to provide a plurality of thermal zones into which the surface is divided, the plurality of heating/cooling devices and thereby the plurality of thermal zones being arranged in a multi-dimensional array and independently controllable to locally heat, cool or maintain a temperature of a component element of the component elements during manufacture of the composite structure therefrom;

a plurality of sensors configured to sense a characteristic of the component element at a respective plurality of spatially-distributed points, and provide sensor data corresponding thereto, wherein each sensor of the plurality of sensors is associated with, and configured to sense the characteristic of the composite structure at, a respective thermal zone of the plurality of thermal zones;

a computing device coupled to the plurality of sensors and configured to apply the sensor data to a machine-learning algorithm configured to generate control data to achieve a defined quality goal for the component element or composite structure, the defined quality goal indicating a desired manufacturing quality of the component element or composite structure; and a controller coupled to the computing device and tool, and configured to independently control the plurality of heating/cooling devices and thereby the plurality of thermal zones to locally heat, cool or maintain the temperature of the component element according to the control data to advance the component element or composite structure to the defined quality goal, wherein the plurality of sensors is configured to sense the characteristic and provide sensor data corresponding thereto, the computing device is configured to apply the sensor data to the machine-learning algorithm, and the controller is configured to independently control the plurality of heating/cooling devices and thereby the plurality of thermal zones, at a plurality of instances during manufacture of the composite structure from the component elements, the machine-learning algorithm learning over the plurality of instances to increase advancement of the component element or composite structure to the defined quality goal.

2. The system of claim 1, wherein the component elements of the composite structure include a bed of fibers pre-impregnated or to be infused with resin, and the plurality of heating/cooling devices and thereby the plurality of thermal zones are independently controllable to locally heat, cool or maintain the temperature of the resin.

3. The system of claim 2, wherein the characteristic of the component element is a presence or absence, temperature, pressure or degree of cure of the resin, or an out-of-plane distortion of the bed of fibers.

4. The system of claim 2, wherein manufacture of the composite structure includes a flow of resin across the bed of fibers to thereby infuse the bed of fibers with resin, and the defined quality goal for the component element or composite structure includes a desired shape of a front of the flow of resin, and wherein the machine-learning algorithm is configured to generate control data to achieve the desired shape of the front of the flow of resin, and the controller is configured to independently control the plurality of heating/cooling devices and thereby the plurality of thermal zones to locally heat, cool or maintain the temperature of the resin to locally control viscosity of the resin and thereby steer the front of the flow of resin to the desired shape thereof.

5. The system of claim 4, wherein the characteristic of the component element is a presence or absence of resin, and the computing device being configured to apply the sensor data to the machine-learning algorithm includes being configured to at least:

generate a binary image bitmap of the bed of fibers indicating the presence or absence of resin at the respective plurality of spatially-distributed points;

extract a contour of a front of the flow of resin from the bitmap to generate a cloud of vector points; and measure along vector points of the cloud of vector points, curvature at each point of at least some of the respective plurality of spatially-distributed points, and thereby produce curvature statistics for application to the machine-learning algorithm configured to selectively apply a penalty or reward at each of at least some of the respective plurality of spatially-distributed points based on the curvature statistics.

6. The system of claim 5, wherein the machine-learning algorithm being configured to selectively apply a penalty or reward includes for each point of at least some of the respective plurality of spatially-distributed points, being configured to selectively apply a penalty or reward for respectively high curvature or low curvature at the point, the machine-learning algorithm being configured to generate control data to achieve the defined quality goal of a straight front of the flow of resin.

7. The system of claim 2, wherein manufacture of the composite structure includes a curing of the resin, and the defined quality goal for the component element or composite structure includes a desired shape of the composite structure, and wherein the machine-learning algorithm is configured to generate control data to achieve the desired shape of the composite structure, and the controller is configured to independently control the plurality of heating/cooling devices and thereby the plurality of thermal zones to locally heat, cool or maintain the temperature of the resin to locally control thermal gradients and degree of cure of the resin, and thereby process-induced strains within the composite structure to counter any springback in the composite structure.

8. The system of claim 1, wherein the component elements of the composite structure include a plurality of plies of fibers each ply of which is pre-impregnated with resin or held together with a binder, and the plurality of heating/cooling devices and thereby the plurality of thermal zones are independently controllable to locally heat, cool or maintain the temperature of the resin or binder, wherein manufacture of the composite structure includes lay-up of a first of the plurality of plies and ply consolidation, and the defined quality goal for the component element or composite structure includes minimization of out-of-plane fiber distortion formed during lay-up of the first of the plurality of plies or ply consolidation, and wherein the machine-learning algorithm is configured to generate control data to achieve the minimization of out-of-plane fiber distortion, and the controller is configured to independently control the plurality of heating/cooling devices and thereby the plurality of thermal zones to locally heat, cool or maintain the temperature of the resin or binder to locally control frictional viscosity of the resin or binder during lay-up of the first of the plurality of plies or ply consolidation.

9. The system of claim 8, wherein the characteristic of the component element is a thickness of the composite structure during lay-up of the first of the plurality of plies or ply consolidation, changes in which indicate an out-of-plane fiber distortion.

10. A method of manufacturing a composite structure, the method comprising:

supporting elements of a composite structure on a surface of a tool, and a plurality of heating/cooling devices configured to provide a plurality of thermal zones into which the surface is divided, the plurality of heating/cooling devices and thereby the plurality of thermal zones being arranged in a multi-dimensional array and independently controllable to locally heat, cool or maintain a temperature of a component element of the component elements during manufacture of the composite structure therefrom;

sensing by a plurality of sensors, a characteristic of the component element at a respective plurality of spatially-distributed points, and providing sensor data corresponding thereto, wherein each sensor of the plurality of sensors is associated with, and senses the characteristic of the composite structure at, a respective thermal zone of the plurality of thermal zones;

applying the sensor data to a machine-learning algorithm that generates control data to achieve a defined quality goal for the component element or composite structure, the defined quality goal indicating a desired manufacturing quality of the component element or composite structure; and independently controlling the plurality of heating/cooling devices and thereby plurality of thermal zones to locally heat, cool or maintain the temperature of the component element according to the control data to advance the component element or composite structure to the defined quality goal, wherein sensing the characteristic and providing sensor data corresponding thereto, applying the sensor data to the machine-learning algorithm, and independently controlling the plurality of heating/cooling devices and thereby plurality of thermal zones, occur at a plurality of instances during manufacture of the composite structure from the component elements, the machine-learning algorithm learning over the plurality of instances to increase advancement of the component element or composite structure to the defined quality goal.

11. The method of claim 10, wherein the component elements of the composite structure include a bed of fibers pre-impregnated or to be infused with resin, and the plurality of heating/cooling devices and thereby plurality of thermal zones are independently controllable to locally heat, cool or maintain the temperature of the resin.

12. The method of claim 11, wherein the characteristic of the component element is a presence or absence, temperature, pressure or degree of cure of the resin, or an out-of-plane distortion of the bed of fibers.

13. The method of claim 11, wherein manufacture of the composite structure includes a flow of resin across the bed of fibers to thereby infuse the bed of fibers with resin, and the defined quality goal for the component element or composite structure includes a desired shape of a front of the flow of resin, and wherein the machine-learning algorithm generates control data to achieve the desired shape of the front of the flow of resin, and the plurality of heating/cooling devices and thereby plurality of thermal zones are independently controlled to locally heat, cool or maintain the temperature of the resin to locally control viscosity of the resin and thereby steer the front of the flow of resin to the desired shape thereof.

14. The method of claim 13, wherein the characteristic of the component element is a presence or absence of resin, and applying the sensor data to the machine-learning algorithm includes at least:

generating a binary image bitmap of the bed of fibers indicating the presence or absence of resin at the respective plurality of spatially-distributed points;

extracting a contour of a front of the flow of resin from the bitmap to generate a cloud of vector points; and measuring along vector points of the cloud of vector points, curvature at each point of at least some of the respective plurality of spatially-distributed points, and thereby producing curvature statistics for application to the machine-learning algorithm that selectively applies a penalty or reward at each of at least some of the respective plurality of spatially-distributed points based on the curvature statistics.

15. The method of claim 14, wherein the machine-learning algorithm selectively applying a penalty or reward includes for each point of at least some of the respective plurality of spatially-distributed points, selectively applying a penalty or reward for respectively high curvature or low curvature at the point, the machine-learning algorithm generating control data to achieve the defined quality goal of a straight front of the flow of resin.

16. The method of claim 11, wherein manufacture of the composite structure includes a curing of the resin, and the defined quality goal for the component element or composite structure includes a desired shape of the composite structure, and wherein the machine-learning algorithm generates control data to achieve the desired shape of the composite structure, and the plurality of heating/cooling devices and thereby plurality of thermal zones are independently controlled to locally heat, cool or maintain the temperature of the resin to locally control thermal gradients and degree of cure of the resin, and thereby process-induced strains within the composite structure to counter any spring-back in the composite structure.

17. The method of claim 10, wherein the component elements of the composite structure include a plurality of plies of fibers each ply of which is pre-impregnated with resin or held together with a binder, and the plurality of heating/cooling devices and thereby plurality of thermal zones are independently controllable to locally heat, cool or maintain the temperature of the resin or binder, wherein manufacture of the composite structure includes lay-up of a first of the plurality of plies and ply consolidation, and the defined quality goal for the component element or composite structure includes minimization of out-of-plane fiber distortion formed during lay-up of the first of the plurality of plies or ply consolidation, and wherein the machine-learning algorithm generates control data to achieve the minimization of out-of-plane fiber distortion, and the plurality of heating/cooling devices and thereby plurality of thermal zones are independently controlled to locally heat, cool or maintain the temperature of the resin or binder to locally control frictional viscosity of the resin or binder during lay-up of the first of the plies or ply consolidation.

18. The method of claim 17, wherein the characteristic of the component element is a thickness of the composite structure during lay-up of the first of the plurality of plies or ply consolidation, changes in which indicate an out-of-plane fiber distortion.

* * * * *